June 12, 1956   A. H. BULLINGTON   2,749,826
ROTARY WEEDER
Filed Dec. 16, 1952

INVENTOR
A. H. BULLINGTON
BY *A. Yates Dowell*
ATTORNEY

United States Patent Office 2,749,826
Patented June 12, 1956

2,749,826

ROTARY WEEDER

Alton H. Bullington, Anton, Tex.

Application December 16, 1952, Serial No. 326,305

1 Claim. (Cl. 97—52)

The present invention relates to farming and, more particularly, to breaking up of the earth around plants and removing weeds without damaging the plant foliage or roots.

Heretofore, in agriculture and truck gardening the earth has been broken up around roots of crops and the weeds have been cut off or otherwise removed. This operation has been slow and expensive because of the large amount of hand labor required, and frequently the overhanging leaves of the plants and the buds or fruit thereof were damaged and at other times the roots were damaged by being cut with the hoe or other implement used in the process.

An object of the present invention is to overcome the difficulties involved in prior agricultural processes, and to provide a rotary weeder which will be effective with a minimum of labor for maintaining the earth in proper condition and particularly to break up crusts of earth over cottom seed before the plant comes up.

A further object of the present invention is to provide a cultivating device which will act upon the ground between the overhanging leaves and the roots to remove weeds and to break up the soil to permit the plant to grow more vigorously.

Another object of the present invention is to provide a rotary weeder which may be used from the time of the first plowing to the time of the last plowing and designed to remove small weeds and prevent weeds coming up after a rain.

Figure 1:
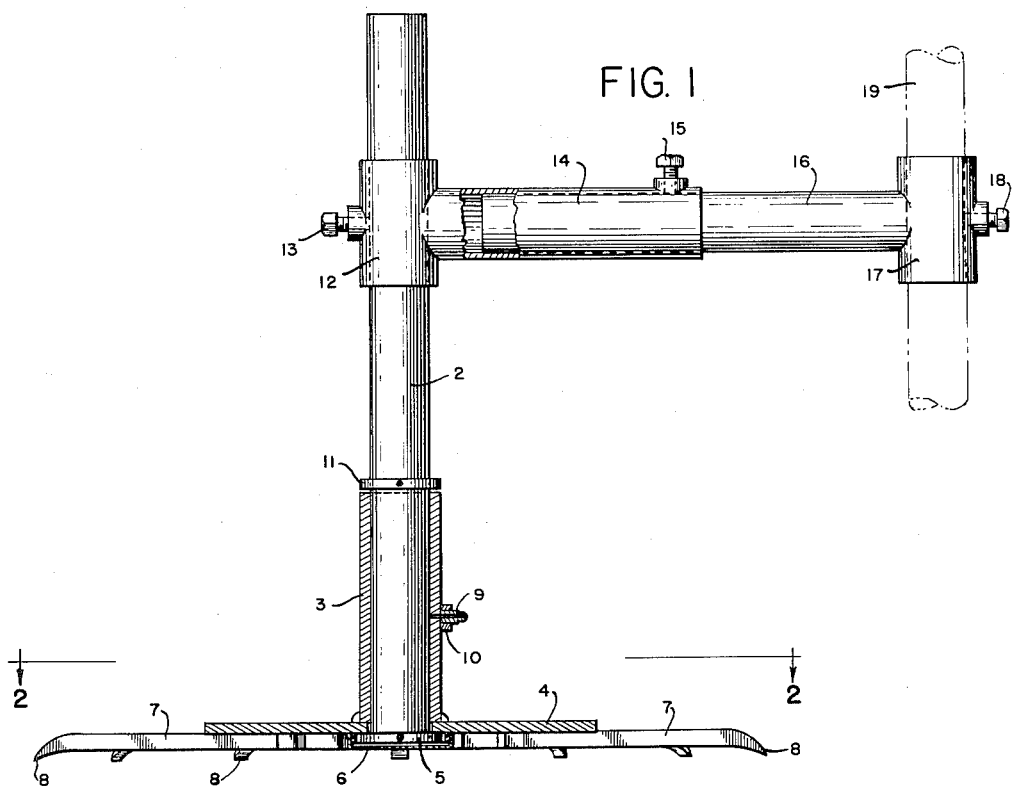
Figure 2:
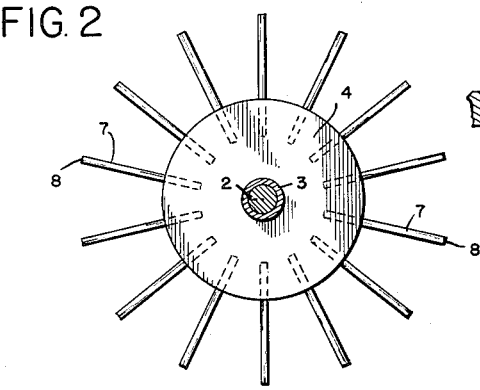
Figure 3:
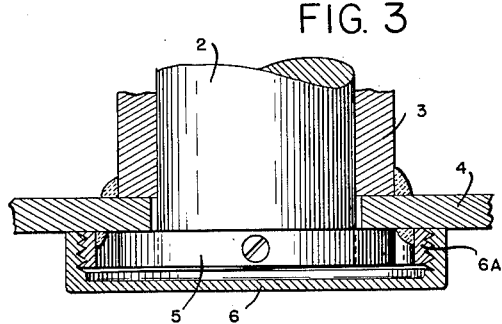

Other and further objects will be apparent as the description proceeds and upon reference to the accompanying drawing wherein:

Fig. 1 is an elevation of the rotary weeder according to the present invention with parts in section and parts broken away and showing the rotary weeder secured to a footpiece shown in phantom lines of a conventional cultivator;

Fig. 2, a section on a reduced scale taken substantially on line 2—2 of Fig. 1 showing the flat disc with the pointed rods projecting therefrom; and Fig. 3, an enlarged detail of the connection between the stationary shaft and rotating disc of Fig. 1 and showing a dust cap to prevent the entrance of abrasive earth into the bearing.

Referring more particularly to the drawing, the rotary weeder of the present invention includes a substantially upright shaft 2 at the lower end of which a bearing sleeve 3 is rotatably mounted. To the lower end of sleeve 3 a generally flat disc 4 is fixedly secured by any suitable means such as welding or the like, such sleeve and disc being prevented from downward removal at the lower end by a collar 5 fixedly connected to the shaft 2 by a set screw or the like whereby the disc and sleeve are maintained in operative relation on the shaft 2. To prevent the entrance of earth or other material which might damage the bearing surface, a dust cap 6 is secured to the generally flat disc 4 by any suitable means such as screw threads on the cap 6 engaging screw threads on a circumferential flange 6A fixed to the disc 4 by any suitable means such welding or the like.

A plurality of slender elongated cultivating rods 7 fixed to the disc 4 by any suitable means project radially therefrom, the outer ends of such rods being provided with points 8. It will be noted that the disc 4 and the rods 7 are of relatively small vertical thickness whereby the rods may project under the leaves and branches of growing plants for cultivating the soil closely adjacent the stem of such plants without damaging the foliage and without disturbing or damaging the roots.

For lubricating the bearing sleeve 3, a fitting 9 is mounted on a boss 10 on the sleeve 3 and communicating with an aperture in the sleeve with bearing surface for lubrication thereof. A second collar 11 is fixed on the shaft 2 above the upper end of the bearing sleeve 3 to prevent vertical movement of the disc 4 upwardly thereby maintaining the cultivating disc and the rods in a definite position for obtaining the best cultivating action.

For securing the rotary weeder by means of the structure such as a footpiece 19 of a cultivator, a sleeve 12 surrounds the shaft 2 and secures such shaft in adjusted position by means of a set screw 13 on the sleeve which engages the shaft 2 to maintain the parts in adjusted condition and another sleeve 17 is adjustably mounted on, for example, a footpiece 19 of a cultivator and is fixed in adjusted position by means of a set screw 18 in a well known manner. A bar 16 and tubular member 14 telescoped together are fixed to the sleeves 17 and 12, the bar being fixed to the sleeve 17 in any suitable manner such as by welding or the like and the tubular member 14 being fixed to the sleeve 12 by any suitable means. A set screw 15 on the tubular member engages the bar 16 to maintain the bar and tubular member in adjusted position while permitting relative adjustment for angularity and lateral spacing so that the most advantageous operating condition may be maintained.

It will be obvious to those skilled in the art that various changes may be made in the invention without departing from the spirit and scope thereof and therefore the invention is not limited by that which is illustrated in the drawing and described in the specification, but only as indicated in the appended claim.

I claim:

A rotary weeder for attachment to a cultivator vehicle for breaking ground along a row of crops and underneath the limbs or overhanging portions of the crop comprising a substantially upright shaft, a first collar detachably secured to the shaft adjacent its lower end, a second collar secured to the shaft and spaced from the first collar, a bearing sleeve rotatably mounted on the shaft between the collars, a flat disk attached to said bearing sleeve transversely to the end of the shaft adjacent to the first collar, a dust cap detachably fastened to the disk to completely enclose the lower end of the shaft and first collar, a plurality of slender elongated cultivating rods attached to the disk and projecting radially therefrom and lying substantially in the same plane as said disk, the outer ends of said rods being pointed, whereby said weeder may reach under the limbs of a plant to break the soil around the crop without injuring the plant, and means for attaching said weeder to a cultivator vehicle; said means comprising a first sleeve adapted to be secured at the desired elevation and angle on said vehicle, and a second sleeve attached to the shaft of the weeder, and fastening means for holding said second sleeve in adjusted position on the shaft, a bar and tubular member telescoped together, one of said bar and tubular members being fixed to said first sleeve and the other of said bar and tubular members having its outer end fixed to said second sleeve, means to fixedly secure said bar and tubular member in adjusted position whereby the disc and the cultivating rods thereon may be arranged in the most advantageous cultivating condition.

References Cited in the file of this patent

UNITED STATES PATENTS

| | | | |
|---|---|---|---|
| 500,349 | Pridmore | June 27, | 1893 |
| 1,076,398 | Vrooman | Oct. 21, | 1913 |
| 1,244,982 | Horst | Oct. 30, | 1917 |
| 1,591,227 | Ness | July 6, | 1926 |
| 2,205,188 | Cuddigan et al. | June 18, | 1940 |
| 2,308,575 | Vickery | Jan. 19, | 1943 |
| 2,388,689 | Hebert | Nov. 13, | 1945 |
| 2,472,414 | Geater | June 7, | 1949 |

FOREIGN PATENTS

Great Britain _____ 1872